United States Patent [19]

Graves

[11] Patent Number: 5,389,716
[45] Date of Patent: Feb. 14, 1995

[54] FIRE RESISTANT CURED BINDER FOR FIBROUS MATS

[75] Inventor: Larry R. Graves, Puyallup, Wash.

[73] Assignee: Georgia-Pacific Resins, Inc., Atlanta, Ga.

[21] Appl. No.: 904,966

[22] Filed: Jun. 26, 1992

[51] Int. Cl.$^6$ ............................ C08J 5/10; C08K 3/20; C08L 61/04

[52] U.S. Cl. ................................. 524/510; 524/492; 524/493; 524/500; 524/509; 524/512; 524/522; 524/541

[58] Field of Search ............... 524/510, 492, 493, 509, 524/512, 522, 500, 541

[56] References Cited

U.S. PATENT DOCUMENTS

| | | | |
|---|---|---|---|
| 2,728,972 | 1/1956 | Drummond et al. | 28/1 |
| 2,886,466 | 5/1959 | Iler et al. | 117/65 |
| 3,007,878 | 11/1961 | Alexander et al. | 252/313 |
| 3,025,588 | 3/1962 | Eilerman | 28/74 |
| 3,077,413 | 2/1963 | Campbell | 106/38.9 |
| 3,215,585 | 11/1965 | Kneipple | 161/170 |
| 3,252,917 | 5/1966 | Mindick et al. | 252/313 |
| 3,292,013 | 12/1966 | Golahny | 307/88.5 |
| 3,470,977 | 10/1969 | Shannon | 181/33 |
| 3,620,913 | 11/1971 | Moore, Jr. | 252/313 |
| 3,719,607 | 3/1973 | Moore, Jr. | 252/313 S |
| 3,804,706 | 4/1974 | Kurashige et al. | 162/109 |
| 3,869,263 | 3/1975 | Greenspan | 51/209 R |
| 3,895,167 | 7/1975 | Gor | 427/388 |
| 3,896,081 | 7/1975 | Baxter et al. | 260/47 R |
| 3,956,171 | 5/1976 | Moore, Jr. et al. | 252/313 S |
| 3,957,708 | 5/1976 | Gor | 260/29.4 UA |
| 3,996,032 | 12/1976 | McWilliams et al. | 65/3 C |
| 4,043,779 | 8/1977 | Schaefer | 65/2 |
| 4,045,196 | 8/1977 | Schaefer | 65/2 |
| 4,129,674 | 12/1978 | Hannes et al. | 428/285 |
| 4,158,555 | 6/1979 | Kallenborn | 65/2 |
| 4,169,914 | 10/1979 | Gallacher | 428/290 |
| 4,255,483 | 3/1981 | Byrd et al. | 428/245 |
| 4,255,485 | 3/1981 | Yau | 428/288 |
| 4,258,098 | 3/1981 | Bondoc et al. | 428/288 |
| 4,341,668 | 7/1982 | Martin et al. | 524/297 |
| 4,457,969 | 7/1984 | Biale | 428/288 |
| 4,522,958 | 6/1985 | Das et al. | 523/212 |
| 4,532,006 | 7/1985 | Winters et al. | 162/3 |
| 4,542,068 | 9/1985 | Whichard | 428/290 |
| 4,592,859 | 6/1986 | Smith-Johannsen | 252/309 |
| 4,609,709 | 9/1986 | Yau | 525/164 |
| 4,637,951 | 1/1987 | Gill et al. | 428/215 |
| 4,794,051 | 12/1988 | Gupta | 428/524 |
| 4,917,764 | 4/1990 | Lalwani et al. | 162/156 |

FOREIGN PATENT DOCUMENTS 480316 3/1938 United Kingdom .

OTHER PUBLICATIONS

"Processed Mineral Fiber in Mats and Papers", by Koenig, *Nonwovens*, p. 133 (1984).

"Advanced Technical Data Sheet" by Nalco Chemical Company (Apr. 1987).

"Material Safety Data Sheet" for Latex DL249NA by Dow Chemical USA (Jun. 7, 1990).

"Ethylene Vinyl Chloride Latex" by Air Products and Chemicals, Inc. (1977).

"Airflex 4514 Developmental Properties" by Air Products and Chemicals, Inc. (1977).

(List continued on next page.)

*Primary Examiner*—Paul R. Michl
*Assistant Examiner*—U. K. Rajguru
*Attorney, Agent, or Firm*—Banner, Birch, McKie & Beckett

[57] ABSTRACT

A binder composition for fibrous mats, preferably inorganic fibrous mats, which is fire resistant when cured is provided. The binder composition comprises a stable mixture of an aqueous aldehyde condensation polymer-based resin, a fire retardant latex and, optionally, an effective amount of an aqueous silica colloid, wherein the weight ratio of the latex to the resin is at least 1:1 on a non-volatile weight basis. The effective amount of the silica colloid is an amount sufficient to enhance the flame resistant property of the binder composition after curing and yet remain compatible with the components of the binder composition prior to curing.

26 Claims, No Drawings

OTHER PUBLICATIONS

"Good-rite ® Latex Hycar ® Latex Geon ® Technical Data Geon ® 460X58" by B. F. Goodrich Chemical Group DATE.

"Good-rite ® Latex Hycar ® Latex Geon ® Latex Technical Data Geon ® 460X63" by B. F. Goodrich Chemical Group Date.

"Good-rite ® Latex Geon ® Latex MSDS No. 5, Material Safety Sheet GEON ® Latex" by B. F. Goodrich Chemical Group, Doc. 85152 (Aug. 24,1988).

"The Colloidal State", *FM 7-78 Nalco IPC Service Manual*, Section 1, (Dec. 16, 1991).

"Nalco", William D. McMillan, (1987).

"Urea Formaldehye Concentrate UFC" by Georgia-Pacific Resin Division, (1984).

"Typical Economics Effected by Using U.F. Concentrate-85 In Place of Aqueous Formaldehye", pp. 6, 9 ∝ 11.

E. T. Hau et al., "The Use of Ethylene Vinyl Chloride Emulsions (EVCl) for Bonding Fiber Glass Mat," Tappi Paper Synthetics Conference (Cincinnati) Proc., pp. 277-290 (Sep. 15-17, 1990).

R. Derby et al., "Some unique Features and Applications of Novel Ethylene Vinyl Chloride Latex Emulsions," Tappi Polymers, Laminations & Coatings Conf. (San Francisco) Proc. (Book 2):587-592 (Sep. 9-11, 1987) (Abstract only).

G. G. Hawn et al., "Chemistry and Applications of Vinyl Acetate-Ethylene (VaE) and Ethylene-Vinyl Chloride (EVCl) Emulsions," Tappi Nonwovens Binders Chem. & Use Seminar (Atlanta) Notes:41-49 (Oct. 3-4, 1983) (Abstract only).

U. S. Application Serial No. 07/905,116.

FIRE RESISTANT CURED BINDER FOR FIBROUS MATS

BACKGROUND OF THE INVENTION

1. Field of the Invention

This invention relates to binder compositions for fibrous mats and more particularly to a binder composition for fibrous mats, particularly of inorganic fibers such as glass fibers and/or mineral fibers, which is fire resistant when cured. The fibrous mats are useful for application in roofing and flooring products, for example, underlayment or facing for materials used in the building and construction industries.

2. Description of the Prior Art

Glass fiber mats and mineral wool fiber mats are composed of glass fibers and mineral wool fibers, respectively, held together by a binder material. Among other applications, such mats are treated to manufacture roofing felts for shingles and built-up roofing applications. Typical binders for glass fibers used by the industry are urea-formaldehyde, phenolic resins, bone glue, polyvinylalcohols, acrylic resins and polyvinyl acetates. See U.S. Pat. No. 4,258,098. Similarly thermosetting resins such as urea-formaldehyde, phenol-formaldehyde and melamine-formaldehyde resins are used to bind mineral wool fibers. See U.S. Pat. No. 3,215,585 (phenol-formaldehyde condensate-crystalline urea); and U.S. Pat. No. 4,542,068 (urea-formaldehyde with an alkoxylated alkyl amine surfactant).

The use of various combinations of aldehyde condensation polymers and latexes (lattices) have been proposed. U.S. Pat. No. 3,804,706 broadly discloses a binder composition containing a thermosetting resin such as urea-formaldehyde, phenol-formaldehyde and melamine-formaldehyde resins and a synthetic, water-insoluble, thermoplastic vinyl resin in an aqueous emulsion such as polyvinyl acetate, vinyl acetate-acrylonitrile copolymer, vinyl acrylate copolymer, vinyl acetate-ethyl acrylate copolymer, vinyl acetate-methylmethacrylate copolymer, and acrylic polymers. See also U.S. Pat. No. 4,637,951 (a heat settable polymer such as urea-formaldehyde and urea-formaldehyde and a latex such as an acetate or acrylic emulsion e.g. polyvinyl acetate); U.S. Pat. No. 4,255,485 (phenolformaldehyde-urea condensate with an emulsified thermoplastic resin e.g. vinylchloride polymer). A binder composition containing an urea-formaldehyde resin and a styrene-butadiene copolymer latex is disclosed in U.S. Pat. No. 4,258,098 (in combination with acrylamide-type monomer); U.S. Pat. No. 4,609,709 (in combination with a fully methylated melamine-formaldehyde copolymer); and U.S. Pat. No. 4,917,764 (narrow range of relative proportions and latex has a Tg <25° C.). In U.S. Pat. No. 4,255,485, an ethylene-vinylchloride emulsion polymer is used as the latex. In U.S. Pat. No. 4,609,709, the binder contains more latex than urea-formaldehyde thermosetting resin.

As these materials are utilized in building materials, there is a desire to improve the fire resistance of such materials. U.S. Pat. Nos. 3,470,977 (Shannon; acoustical board); U.S. Pat. No. 4,255,483 (Byrd et al.; fire barrier) and U.S. Pat. No. 4,457,969 (Biale; non-woven fabrics) relate to fire resistant fiber-composites. Colloidal silica is mentioned as an additive for improving fire resistance in U.S. Pat. No. 3,470,977 (Col. 2, lines 40–51) and in U.S. Pat. No. 4,255,483, in combination with a polyamide resin. U.S. Pat. No. 4,457,969 describes the fire resistance benefit attributable to latex polymers containing chloride. Latex polymers containing chloride in glass mat binder compositions are disclosed in U.S. Pat. No. 4,255,485 (Yau) without any mention of the fire resistance benefit attributable to such latexes.

The use of colloidal silica in binders for glass and minerals fibers is also known. See, for example, U.S. Pat. No. 2,886,466 (Ikler et al.) and U.S. Pat. No. 3, 077,413 (Campbell). U.S. Pat. No. 3,252,917 (Mindick et al.; Col. 12, lines 63–68) teaches the use of colloidal silica as a fire retardant.

U.S. Pat. No. 4,522,958 discloses a solvent based, organic, high solids coating composition containing a film-forming binder system containing a crosslinkable resin such as a thermosetting resin e.g. aminoplasts (etherified urea-formaldehyde and melamine-formaldehyde resins); a colorless, substantially inorganic microparticles stably dispersed in the coating composition (e.g. colloidal silicas which is optionally surface modified with carbon-containing molecules); and a solvent system. The coating may be used to coat fiber glass. There is no mention regarding the fire resistance benefit attributable to the use of colloidal silica.

However, the search continues for improved binder compositions for fibrous mats, particularly of inorganic fibers such as glass and/or mineral fibers, which are fire resistant when cured.

SUMMARY OF THE INVENTION

Accordingly, it is an object of the present invention to provide a binder composition for fibrous mats having improved fire resistant properties when cured.

According to the present invention, there is provided a binder composition for fibrous mats, preferably of inorganic fibers such as glass or mineral fibers, wherein the binder composition is fire resistant when cured. The binder composition comprises a stable mixture of a fire resistant latex, preferably a halogenated latex polymer, more preferably also carboxylated; an aqueous aldehyde condensation polymer-based thermosetting resin, preferably an urea-aldehyde thermosetting resin; and, optionally, further comprises an effective amount of an aqueous silica colloid. The weight ratio of the latex to the aldehyde condensation polymer is at least 1:1 on a non-volatile weight basis. The effective amount of the silica colloid is an amount sufficient to enhance the flame resistant property of the binder composition after curing and yet remain compatible with the other components of the binder composition prior to curing. The effective amount of the silica colloid preferably ranges from about 0.1 to about 10% by weight of the resin, more preferably from about 0.1 to about 5% by weight, non-volatile basis. Preferably, the silica colloid is a cationic silica colloid.

Though the various ingredients of the subject composition are known in the prior art and are used separately in the kind of application envisioned for the binder of the present invention, there is no teaching for combining them into a single binder composition. The binder composition of the present invention surprisingly enhances the flame resistance of fibrous mats containing the cured binder composition. Surprisingly, when colloidal silica is used, a much lower weight fraction of colloidal silica is utilized in the present invention than amounts used in prior art compositions utilizing colloidal silica for enhancing fire retardancy.

According to the present invention, there is also provided a fire resistant binder for fibrous mats, preferably of inorganic fibers such as glass or mineral fibers, comprising a stable mixture of a fire resistant latex, preferably a halogenated latex polymer, more preferably also carboxylated; and a modified urea-aldehyde condensate thermosetting resin, more preferably a modified urea-formaldehyde condensate, wherein the modified urea-aldehyde condensate is prepared by reacting the condensation reactants during the condensation reaction with ammonia or a primary polyamine, wherein the ammonia may be aqueous ammonia or anhydrous ammonia and the polyamine is preferably an alkyl primary diamine, more preferably a $C_1$-$C_6$ alkyl primary diamine. This embodiment of the binder composition of the present invention surprisingly and synergistically enhances the flame resistance of fibrous mats containing the cured binder composition.

The binder composition of the present invention preferably contains from about 5 to about 50% of the aldehyde condensation polymer-based resin and correspondingly about 50 to about 95% by weight of a fire resistant latex. The binder composition, optionally, but preferably further comprises about 0.1 to about 10%, more preferably about 0.1 to about 5%, by weight of the silica colloid based on the non-volatile weight of the resin. The cured binder composition has shown the ability to provide a bonded mineral wool/glass mat that passes the "Class B" ASTM rating (ASTM E84-87a) and is expected to provide a "Class A" ASTM rating with mineral fiber mats.

Such mats may be applied as backing layer to plywood, gypsum, and other similar structural materials. Such mats also may be used as an underlayment between roofing materials such as cedar shakes and the plywood roofing deck, as a backing material for roofing products, and as a backing for carpeting and the like. Structures and building materials utilizing fiber mats wherein the binder composition is that of the present invention will have demonstrated improvement in fire resistance.

DESCRIPTION OF THE INVENTION

In accordance with the present invention, there is provided a binder composition for fibrous mats, preferably inorganic fibrous mats, for example mats of glass and/or mineral fiber, which is fire resistant when cured. The composition of the binder has a direct effect on both the fire resistance and the textured and folding properties of the mat.

The binder composition comprises a stable mixture of an aqueous aldehyde condensation polymer-based resin, a fire retardant latex and, optionally, an effective amount of an aqueous silica colloid, wherein the weight ratio of the latex to the resin is at least 1:1 on a non-volatile weight basis. The effective amount of the silica colloid is an amount sufficient to enhance the flame resistant property of the binder composition after curing and yet remain compatible with the components of the binder composition prior to curing. The effective amount of the silica colloid preferably ranges from about 0.1 to about 10% by weight of the resin, more preferably from about 0.1 to about 5% by weight, non-volatile basis.

The proportions of the components of the binder composition may vary widely, but in a preferred embodiment proportions within the following approximate ranges which yield compatible or stable compositions, expressed as weight percentages of non-volatile materials, will be found satisfactory: about 5 to 50% aldehyde condensation polymer and 50 to about 95% fire resistant latex based on the weight of the polymer and latex. The composition also comprises from about 0.1 to about 10% silica colloid based on the weight of the aldehyde condensation polymer. Proportions within the following narrower approximate ranges are more preferred: about 20 to about 40% aldehyde condensation polymer and about 60 to about 80% latex based on the weight of the polymer and latex, plus about 0.1 to about 5% silica colloid based on the weight of the aldehyde condensation polymer.

In another preferred embodiment of the present invention, the silica colloid is optional and the aldehyde condensation polymer is a modified urea-aldehyde. The foregoing proportions for the latex and the resin would apply in the present embodiment also. The silica colloid optionally may be added thereto. Accordingly, the silica colloid ranges from 0 to about 10 percent by weight, preferably from 0 to about 5 percent by weight, based on the weight of the aldehyde condensation polymer.

Other components such as antifoamers, biocides, pH control agents, etc. may also be present in small proportions.

The total concentration of non-volatile components in the aqueous binder composition can vary widely, but it will usually be found convenient and satisfactory to make up this composition at total solids in the range from about 5 to about 40 percent by weight of the total aqueous composition. Total solids from about 20 to about 35 percent by weight are preferred.

The amount of binder applied to the mat can vary considerably, but loadings in the range of about 3 to about 45 percent by weight, preferably about 10 to about 30 percent by weight, and more preferably about 15 to about 25 percent by weight, of non-volatile binder composition based on the dry weight of the bonded mat, will be found advantageous.

Compatibility or stability of the mixture relates to the ability of mixing the latex and the resin together without premature solids formation such as by precipitation or coagulation. Further, compatibility with respect to the silica colloid relates to water dilutability (at least 10 parts by weight of water per 1 part binder) of the binder composition such that "fish eyes" do not form and the silica does not phase separate from the resin forming a gummy, guey material which will cause plugging in the application system. The level of compatibility of the binder composition's components is based on the balancing of the charge of the components. The charge problems encountered may be controlled during formulation and with proper pH control of the finished mixture. Suitable operating points or formulations can be readily determined by those skilled in the art as such concerns of compatibility exist in the prior art formulations of latex and resin and formulations of silica colloid and resin.

The binder composition of this invention can be employed with any fibers which can be formed into mats in any suitable manner. The fibers may be organic or inorganic, preferably inorganic fibers. Inorganic fibers include, but are not limited to, glass fibers, mineral fibers, graphite fibers, metal fibers and metal coated glass or graphite fibers. Organic fibers include, but are not limited to, acrylic, aromatic polyamide, polyester, cellulosic including cellulose, and polyolefin fibers. The fibers generally comprise from about 10 to about 80 percent by weight of the solids, dry weight basis. The inorganic fibers are preferred for fire resistant applications.

The binder composition of the invention sets or cures at elevated temperatures below the decomposition temperature of the resin and the latex. The setting or curing of the binder composition occurs at temperatures from about 135° C. to about 300° C. preferably from about 135° C. to about 275° C. At these temperatures, the binder composition will typically solidify in periods ranging from about 2 to about 25 seconds. Although solidification of the binder composition may occur more rapidly at higher temperatures, excessively high temperatures can cause deterioration of the binder composition or the fibers of the mat, which in turn causes a deterioration of the bonded mat physical and functional properties.

The weight ratio of the aldehyde condensation polymer to the latex in the binder composition is greater than or equal to 1:1 on a non-volatile basis. Accordingly, the latex ranges from 50 to about 95 percent by weight and the aldehyde condensation polymer ranges from about 5 to 50 percent by weight based on the weight of the latex and the aldehyde condensation polymer. In one preferred embodiment, the silica colloid ranges from about 0.1 to about 10% by weight based on the weight of the resin (aldehyde condensation polymer) on a nonvolatile basis. In another preferred embodiment, the aldehyde condensation polymer is a modified urea-aldehyde condensate and the silica colloid ranges from 0 to about 10% by weight based on the resin on a non-volatile basis.

Many of the aldehyde condensation polymers of phenol, resorcinol, urea, and melamine have been widely used as adhesives and their properties are well known. The aldehyde condensation polymers which can be used in this invention have reactive alkylol groups, and are well known and commercially available. These polymers may be cationic, anionic or nonionic, preferably nonionic. As earlier noted, a key constraint is compatibility of the resin with the latex. In this context, compatibility refers the ability to mix the latex and the resin together without premature solids formations such as by precipitation or coagulation "Polymers", as used herein, means resinous mixtures which do not crystallize or have a sharp melting point. Particularly, preferred polymers are those having "reactive alkylol groups" which are alkylol groups capable of reacting with ammonia or the amines used in this invention to modify the aldehyde condensation polymers. "Condensation" is used herein to mean a polymerization reaction in which a molecule, such as water, is eliminated and is to be distinguished from "addition" in which no by-product is formed. Further, the aldehyde condensation polymers used in this invention exclude those having dominant amide forming substituents.

Three classes of polymers are preferred: phenoplasts, aminoplasts, and ketone-aldehyde condensation polymers. They include such resins as the acid or base catalyzed phenol-aldehyde resins, urea-aldehyde resins, melamine-aldehyde resins, acetone-aldehyde resins, etc. The following references cited in U.S. Pat. No. 3,896,081 disclose methods of preparing the condensation resins useful in this invention: "The Chemistry of Synthetic Resins" by Carleton Ellis, Reinhold Publishing Co., 1935; "Phenolic Resin Chemistry" by N. J. L. Megson, Academic Press Inc., New York, 1958; "Aminoplasts" by C. P. Vale, Cleaver-Hume Press Ltd., London, England; and British Pat. No. 480,316. See also U.S. Pat. No. 4,794,051 (phenoplasts) and U.S. Pat. No. 4,169,914 (aminoplasts).

Specifically, the aldehyde condensation polymers which can be used include (1) phenoplasts comprising the condensation polymers of an aldehyde such as formaldehyde with a phenolic type material having at least two positions ortho and/or para to the hydroxyl group open for reaction, such as phenol, phenol-resorcinol, xylenol, cresol, resorcinol, and their derivatives, (2) aminoplasts comprising the condensation polymers of an aldehyde such as formaldehyde with compounds such as benzoguanamine, dicyandiamide, urea, melamine-urea, melamine, and their derivatives, and (3) ketone-aldehyde condensation polymers such as acetone-formaldehyde, methyl ethyl ketone formaldehyde, methylisobutyl ketone formaldehyde, and the like. The preferred resins are water-soluble, liquid, thermosetting urea-aldehyde resins, more preferably urea-formaldehyde resins. Urea-aldehyde resins are lower in smoke production, particularly if free monomer is less than 2 percent. Novolacs, because they lack reactive alkylol groups and lack water solubility, are not directly useful in this invention; they may be further reacted with aldehyde to convert them to useful resoles. Each of the aldehyde condensation polymers mentioned above is prepared and kept under conditions which prevent it from condensing to an infusible state by known methods.

The aldehyde used in preparation of the condensation polymer may be (1) monofunctional (i.e., a monoaldehyde), or (2) polyfunctional, having at least two aldehyde groups separated by at most one carbon atom, and can be, for instance, formaldehyde, paraformaldehyde, polyoxymethylene, trioxane, acrolein, and aliphatic or cyclic aldehydes such as glyoxal, acetaldehyde, propionaldehyde, butyraldehyde, and furfuraldehyde. Condensation, when using formaldehyde, furfuraldehyde, paraformaldehyde, polyoxymethylene or trioxane, is generally accomplished with the use of a mildly acid, alkaline, or no catalyst. When using acrolein, glyoxal, acetaldehyde, propionaldehyde, or butyraldehyde, condensation is generally accomplished by combining the reactants in the presence of a strongly acid catalyst, neutralizing the reaction product, adding more aldehyde, and further reacting in the presence of a mildly acid, or alkaline, catalyst. See generally U.S. Pat. No. 3,896,081.

The aldehyde condensation polymers mentioned above may be modified by reacting either the condensation reactants during the condensation reaction or the condensation polymer after the condensation reaction with ammonia, preferably aqueous ammonia, or a primary polyamine, preferably a primary diamine, to yield a modified aldehyde condensation polymer. An example of the latter is disclosed in U.S. Pat. No. 3,896,081 to Baxter et al., which is incorporated herein by reference. Preferably, the modified aldehyde condensation polymer is produced by reacting the condensation reactants during the condensation reaction with the ammonia or a primary polyamine, preferably an alkyl primary diamine, more preferably a $C_1-C_6$ alkyl primary diamine, for example ethylene diamine. The ammonia may be aqueous ammonia or anhydrous ammonia.

The aldehyde condensation polymer-based resin of the binder composition are also commercially available materials, for example, urea-formaldehyde resins such as the types sold by Georgia Pacific Resins, Inc., Atlanta, Ga. (such as GP-2904 and GP-2914), sold by Borden Chemical Company, Columbus, Ohio, and sold by Neste' Resins Corporation, Eugene, Oreg., for glass mat application may be used. These resins generally are modified with methylol groups which upon curing form methylene or ether linkages. Such methylols may include N,N'-dimethylol; dihydroxymethylolethylene; N,N'-bis(methoxymethyl), N,N'-dimethylolpropylene; 5,5-dimethyl-N,N'-dimethylolpropylene; N,N'-dimethylolethylene; N,N'-dimethylolethylene and the like.

The fire resistant latex used in the invention is an aqueous emulsion of a thermoplastic polymer (latex), which is halogenated and preferably also carboxylated. The thermoplastic polymers useful in the present invention include homopolymers of vinyl chloride and vinylidene chloride and copolymer of vinyl chloride and vinylidene chloride with each other or separately with comonomers such as olefins, vinyl acetate, vinyl esters such as vinyl propionate and vinyl butyrate, as well as alkyl-substituted vinyl esters. Additionally, copolymers of vinyl chloride or vinylidene chloride with acrylic comohomers such as acrylic acid, methacrylic acid, and the alkyl esters thereof, may be useful in the present invention. Examples of such latex polymers are carboxylated vinylidene chloride/butadiene emulsion polymers and ethylene/vinyl chloride emulsion polymers.

While these resins may be emulsified with any emulsifying agent compatible with other components of the composition, anionic surfactants are preferred. Suitable emulsified ethylene-vinylchloride polymers are AIRFLEX 4500, 4514 and 4530, Dow 244, and Geon® 46Ox58 and 46Ox63. (AIRFLEX is a registered trademark of Air Products and Chemicals, Inc. and Geon® is a registered trademark of B.F. Goodrich Co.). These AIRFLEX polymers contain small proportions of amide functionality, have particle sizes from about 650 to 900 angstroms, are emulsified with an anionic surfactant and have a very slightly alkaline pH. Another suitable vinyl resin is the vinyl acetate/vinyl chloride copolymer dispersion resin commercially available from the Occidental Chemical Corporation under the trade designation Oxy 565. A suitable emulsified Carboxylated vinylidene chloride/butadiene polymer is Dow DL249NAC available from Dow Chemical which contains a bactericide and antioxidant (45-50% polymer, 50-55% water). Other vinylidene chloride interpolymers are disclosed in U.S. Pat. No. 4,457,969, which is hereby incorporated by reference.

Any of the commercially available aqueous silica colloids (emulsions) should be useful as the third component of the binder composition, including non-ionic, anionic and cationic silica colloids, preferably cationic silica colloids. Water dispersible silica gels may also be used in lieu of or in combination with silica colloids. Again, the key constraint is compatibility of the colloid with the latex and resin.

Not wishing to be bound to any particular theory, it is believed the silica colloid provides an inorganic type of binder to assist the organic polymers in the binding of the fibers in the final phase of organic burnoff. The silica colloid is deposited on the fiber surface and fiber junction matrix and provides an inorganic bond between fibers. The nature of the inorganic bond, whether a chemical bond or physical phenomena, is presently unknown. Although low in concentration with respect to the overall binder content, this additive appears to contribute to the retention of mat integrity under direct forced flame conditions.

The cationic colloidal silica is an aqueous dispersion of positively charged colloidal particles consisting of a dense silica core coated with a positively charged polyvalent metal-oxygen compound typically stabilized with a counterion.

Suitable cationic colloidal silica materials include those of U.S. Pat. Nos. 3,007,878, 3,252,917, 3,620,978, 3,719,607 and 3,956,171, which are all incorporated herein by reference. These are aqueous dispersions of positively charged colloidal particles consisting of a dense silica core coated with a positively charged polyvalent metal-oxygen compound, e.g., of the class consisting of metal oxides, metal hydroxides and hydrated metal oxides of metals having a valence of 3 or 4, preferably aluminum and titanium. Most preferably, the dispersion is acidic, and the coating is of polymeric alumina species. Typically, the mole ratio of aluminum to silica on the surface is about 1:1, and the dispersion (which has been commercially available as Ludox Positive Sol 130M, from E.I. Du Pont de Nemours & Co.) is stabilized with a counterion, as described in the aforesaid U.S. Pat. No. 3,007,878. The dispersion has been supplied at 30% solids, stabilized with chloride ion (1.4%, as NaCl) for use in the pH range 3.5 to 5.5. Another suitable cationic colloidal silica is Nalco® 1SJ-612 available from NALCO Chemical Co., Naperville, Ill. Others are Ludox HS, a sodium stabilized colloidal silica; and Ludox AM, a stabilized cationic colloidal silica or silica sol; both marketed by Du Pont.

The colloidal particles exhibit a surface area of about 150-225 $m^2/g$ by nitrogen absorption, a particle diameter of about 15-16 microns, and a molecular weight of about 5 to 18 million by light scattering.

These are examples of water dispersed colloids. These silica colloids can be considered polymers, and they interact when mixed to form colloidal aggregate particles of low surface charge which surround the internal phase droplets in quite the same manner as the particles formed by the interaction of the soluble anionic and cationic emulsifying agents. See U.S. Pat. No. 4,592,859.

Additional ingredients can be formulated into the latex and/or resin to aid in processing and to vary the end-use properties of the fibrous mat. For example, surfactants may be utilized to assist the latex in wetting and penetrating the mat of fibers. Thickeners may be utilized to increase the viscosity of the latex and thereby limit strike-through of the latex. Film-forming aids, including both volatile and non-volatile organic solvents, for the vinylidene chloride interpolymer may be incorporated into the latex. Defoamers are useful to assist in processing. Mildewcides and/or fungicides may provide stabilities toward degradation of the end product.

In particular, it may be desirable to increase the fire resistance of the fibrous mats, such as non-woven fabrics, utilizing the binder composition of the instant invention by incorporating fire-resistant pigments and salts and/or organic compounds having fire-resistant properties into the latex. Examples of such pigments include titania, silica, etc. A preferred pigment is antimony oxide which may impart synergistic fire-resistance properties to flammable materials when utilized in conjunction with the fire resistant latexes utilized herein, such as the vinylidene chloride interpolymer. Many salts and organic compounds are known to impart fire-resistance to flammable materials. For example, phosphorus, in a salt or in an organic compound, is a well known fire retarding agent. Thus, ammonium, alkali metal, and alkaline earth metal phosphates and polyphosphates may be combined in the above latex. Organophosphorus esters are known plasticizers for many polymers and therefore may be combined in the above latex, such as vinylidene chloride interpolymers to provide or increase fire-resistance, with the additional effect of plasticizing the vinylidene chloride interpolymer. Finally, halogen-containing salts and compounds are useful fire retardants; therefore, brominated organics and chlorinated waxes may be combined with the coatings for additional fire resistance.

The binder composition of the present invention may be prepared by combining an aqueous aldehyde condensation polymer-based resin, a flame resistant latex and, optionally, further comprises an effective amount of a silica colloid. The components of the binder composition may be combined in any order. Preferably, the silica colloid is added to the aldehyde condensation polymer and this mixture is then added to the latex emulsion.

As previously noted, the binder composition of this invention can be employed with any fibers which can be formed into mats in any suitable manner. The fibers may be organic or inorganic, preferably inorganic fibers. Inorganic fibers include, but are not limited to, glass fibers, mineral fibers, graphite fibers, metal fibers and metal coated glass or graphite fibers. Organic fibers include, but are not limited to, acrylic, aromatic polyamide, polyester, cellulosic including cellulose, and polyolefin fibers. The fibers generally comprise from about 10 to about 80 percent by weight of the solids, dry weight basis. The inorganic fibers are preferred for fire resistant applications.

The mineral wool useful in the present invention may be rock wool or slag wool, either long-fiber or loose wool, or what is known in the trade as granulated or modulized wool. Mineral wool fibers comprises oxides of silicon, aluminum, calcium, and magnesium, and other mineral oxides. The percentage of silicon dioxide typically range from about 35 to 50 percent.

Mineral wool fibers are produced according to well-known methods, such as fiberization through a spinning disk fiberizer. A wool fiber suitable for use with this invention is available from Bradford Eneroon, Inc., Grand Forks, British Columbia, and is sold under the trade name ENERWOOL. Depending upon the desired result, various sizing compounds may be added to the wool fibers.

Preferably, the mineral wool fibers are of random length, but are generally within the range of about 6 mm to about 76 mm, and preferably about 25 mm. Typically, these fibers are between about 2 and about 6 microns in diameter, but larger fibers would perform adequately with this invention.

Most mineral wool fiber is produced from raw materials such as iron blast furnace slag, copper refinery slag, or lead blast furnace slag. These raw materials are readily available, and mineral wool is therefore generally very economical to use.

The glass fibers useful in the present invention are any conventional glass fibers. Glass fibers comprise primarily of oxides of silicon, but oxides or other minerals such as magnesium and aluminum are often present in relatively low concentrations. PPG Industries, Inc., Pittsburgh, Pennsylvania, manufactures glass fibers suitable for use with the present invention, and markets such fibers under the trade name CHOPPED STRAND.

The glass fiber strands themselves are composed of glass fibers produced from molten streams of glass attenuated from small orifices in a bushing in a glass batch melting furnace. The glass fibers are obtained from conventional "E-Glass" and/or "621-Glass" and derivatives thereof including any more environmentally acceptable derivatives, and other types of glass such as "A" glass, "C" glass, "S" glass and "T" glass. Though "T" glass has a lower softening point than the other specifically mentioned glasses, this property of "T" glass may be used to bind glass fibers together at contact points. The glass fiber strands may be produced in a wet Chop or dry chop operation to produce chopped glass fiber strands having lengths particularly from about 1/32 inch (about 1 mm) to about 3 inches (about 75 mm). Generally, the glass fibers making up the dry or wet chopped glass fiber strands have filament diameters ranging from about 3 to about 30 microns. The chopped glass fiber strands can be of a filament diameter in this range or can be a mixture of filament diameters having an average filament diameter in this range. These fibers can be sized upon production and collected in the suitable manner including random dry distribution or dispersion in water and collection therefrom. Mats so formed can be of any desired thickness. Representative of a method of fiber formation and sizing application is the process illustrated in FIG. 1 of U.S. Pat. No. 3,025,588. See also for example, U.S. Pat. Nos. 4,255,485; 4,542,068 and 4,609,709; which also relate to glass fibers are herein incorporated by reference. The processes disclosed therein are readily adaptable to other fibers, particularly other inorganic fibers.

In a preferred mat embodiment, the glass fibers used are substantially uniform in length within a range of about 12 mm to about 44 mm, and more preferably about 19 mm in length. These fibers typically have an average diameter from about 10 to about 20 microns, and more preferably about 15 microns. Glass fibers known as K, L, and M filaments are readily available in the industry and fall within this range of dimensions.

The glass fibers improve the structural foundation of the finished mat by increasing its tear resistance and tensile strength, and also improve the folding and working qualities of the mat. Glass fibers are also relatively fire resistant, although they generally are not as highly fire resistant as mineral wool.

Generally, in glass fiber production, glass fibers emerge from orifices of an electrically heated bushing of a glass batch melting furnace. These fibers are attenuated and by means of a strand pulling device these filaments are gathered to form a strand of glass fibers which may comprise numerous individual fibers. The sizing is applied to the fibers by a conventional size applicator, such as a kiss applicator or a belt applicator device (although spray type applicators could be used). Detail of a sizing applicator is shown in U.S. Pat. No. 2,728,972. The filaments after exiting the bushing are cooled by air or preferably water. The filaments are gathered into bundles by a gathering shoe and are then led to a strand pulling device such as illustrated in U.S. Pat. No. 3,292,013. The glass fiber strand or strands, if the filaments exiting from the bushing have been separated into several strands, are then wound onto a forming tube on a collet rotating at approximately 7,500 rpm to produce a strand travel of approximately 12,000 to 15,000 feet per minute. The glass fiber strand forming packages are then dried and the strands from the package may be dry chopped separately or together or in the form of roving.

The wet chop operation for producing chopped glass fibers having an aqueous sizing or treating composition can be performed by any conventional wet chop process known in the art. For example, the processes of U.S. Pat. Nos. 3,869,263; 3,996,032; 4,043,779; 4,045,196; and 4,158,555; can be used.

Fibers of varying sizes may be blended together to form the mat. By varying the length and diameter of the fibers the structural properties of the finished product may be altered. For example, fiber with larger dimensions would tend to give the finished mat an abrasive hand or feel. Fiber mats which utilize a blend of fibers of varying sizes are known in the art. For example, in U.S. Pat. No. 4,637,951 (Gill et al.), a fiber mat that uses a blend of "base" fibers and "microfibers" is disclosed. Both are monofilament glass fibers, but the microfibers are smaller in both length and diameter than the base fibers. The resulting mat is said to be more porous than mats produced by previously known methods, and is thus better suited for use as a substrate for subsequently applied coatings such as a vinyl flooring. Similarly, U.S. Pat. No. 4,129,674 (Hannes et al.) discloses a wet process fiber mat which utilizes two different sizes of glass fibers. This particular mat is formed by combining monofilament glass fibers with elongated glass fiber bundles. The fiber bundles reinforce the mat and improve tear resistance. The mat is suitable for use in the manufacture of roofing materials.

It is also known that mineral wool may be partially or wholly substituted for glass wool in a blended mat. Fiber mats containing up to twenty-five percent mineral wool and seventy-five percent glass wool are described in an article written by Koenig, and entitled "Processed Mineral Fiber in Mats and Papers," (1984 Nonwovens, pg. 133). And U.S. Pat. No. 4,532,006 (Winters et al.) discloses a wet process fiber mat wherein the percentage of the mineral wool fibers and glass fibers may be varied up to 100 percent of the other.

As noted, other types fibers may be incorporated into the blend of wool fibers and glass fibers, depending upon the desired properties of the finished mat. For example, organic fibers including but not limited to polyester, polyamide and cellulosics may be incorporated to alter the handling properties of the finished mat. The fire resistance of the mat having organic fibers incorporated therein will be generally maintained where the preferred ratio of wool fibers to glass fibers is maintained at the levels noted below.

The fire resistance of the mat is also related to the ratio of wool fibers to glass fibers, and to the composition of the binder. The weight ratio of wool fibers to glass fibers may range from 0:1 to 1:0, preferably from about 1:1 to about 9:1 and more preferably about 7:3 to about 9:1. For example, the weight ratio of 9:1 means 90 percent wool fibers to 10 percent glass fibers on a dry weight basis. However, the more preferred weight ratio (from about 7:3 to about 9:1) has been found to produce a mat with a high degree of fire resistance and desirable functional and workable properties. Further, a suitable fire resistant mat may be produced using a ratio of wool fibers to glass fibers of 1:1 (i.e., 50 percent wool fibers to 50 percent glass fibers on a dry weight basis). Therefore, any ratio of wool fibers to glass fibers from about 1:1 to about 9:1 would result in a suitable fire resistant mat.

The ratio of wool fibers to glass fibers also has a direct effect on the functional properties of the finished mat. In general, as the percentage of wool fibers is increased relative to the percentage of glass fibers, the finished mat tends to become more brittle, less foldable, and has decreased tensile strength. However, the fire resistance of the mat increases as the percentage of wool fibers increases. As previously discussed, selection of a proper binder is important to offset these competing characteristics.

The functional properties of the finished mat are also affected by the dimensions of the fibers. Longer fibers and fibers having a large diameter will tend to produce a finished mat with a coarser hand. Conversely, shorter, smaller diameter fibers contribute to a mat having a relatively softer hand. Thus, both the ratio of mineral wool fibers to glass fibers, and the dimensions of each of the fibers selected will affect the functional properties of the finished mat. The precise combination of fibers used in the mat depends upon the functional properties desired in the finished mat.

Turning to the production of the mat, non-woven fiber mats, including a mat prepared using the binder composition of the present invention, are typically manufactured by a process known as the "wet" process. This process is well known in the art, and is typified by the disclosure in U.S. Pat. No. 4,129,674. In a typical wet process, an aqueous slurry is formed which includes mineral wool fibers, glass fibers, other inorganic fibers, organic fibers and combinations thereof. A preferred combination of fibers is a combination of mineral wool and glass fibers. By way of illustration, and not limitation, the "wet" process is further described in the context of using a combination of mineral wool and glass fibers, but is equally applicable to either type of fiber alone or any of the fibers previously mentioned. Both the wool and the glass fibers of predetermined diameter and length are preweighed, then metered into a slurry or mix tank in a conventional manner. The slurry or mix tank contains a predetermined amount of water, and also typically contains a viscosity modifier and a fiber dispersant. NALCO 2386, sold by NALCO, Chicago, Ill., has been found to be a satisfactory viscosity modifier, and Katapol VP532, sold by Rhone Poulenc, is a satisfactory fiber dispersant. The percentage of fiber in the slurry is preferably quite low, typically around 0.2 percent, but a range of about 0.1 percent to about 0.5 percent fibers in the slurry is acceptable. The slurry is actively agitated in the slurry tank. The combined action of the agitation and the viscosity modifier and dispersant ensures that the wool fibers and the glass fibers are randomly and completely dispersed throughout the slurry.

After the fibers are thoroughly dispersed in the slurry tank, the slurry is pumped into a section of the processing line known as a head box. A continuously moving porous screen, known as the forming wire, moves through the head box. The fibers are deposited on the forming wire in a continuous membrane as the screen moves through the slurry. Most of the water passes through the screen, leaving the fibers in a continuous, randomly oriented, non-woven membrane on the screen. A vacuum located immediately downstream thereafter removes a majority of water from the membrane. The water which is removed by vacuum typically is recycled through the system.

The continuous membrane of fibers is then transferred to a second screen for conveyance through the section of the processing line where the binder is applied. The amount of the binder used in the fibrous mat is in the range of about 3 to about 45 percent by weight of the bonded mat, preferably about 10 to about 30 percent by weight. If the amount of the binder is to great, the porosity and strength of the mat could be adversely affected, and, if the amount is too low, the integrity of the mat could be adversely affected. The liquid binder composition of the present invention may be applied to the fibers comprising the mat by any coating and/or impregnating method known to the art which is convenient in the circumstances. Thus, the liquid binder composition may be sprayed onto the fibers during their deposition into the mat or onto the mat itself. Another method, which minimizes escape of binder into the work place environment and also provides the possibility for conveniently recovering and recirculating excess liquid binder composition, is to flow-coat or immerse the unbonded mat in a bath of the liquid binder composition or to flood the unbonded mat with the liquid binder composition, in either case straining off by gravity, but prefereably under vacuum, excess liquid binder composition, if any, which may be recovered and recycled. For example, binder may be applied to the top and bottom of the membrane in a conventional manner. Typically, the top of the membrane is coated with binder by means of a curtain coater and the bottom of the membrane is coated by way of surface contact. Enough binder is applied to the membrane to completely saturate the fibers. A second vacuum, located downstream of the curtain coater, then removes excess binder. Generally, the amount of binder remaining in the membrane after this vacuuming process is within the range of about 15 to 30 percent by weight of the wet membrane, for example, about 20 percent by weight.

Typically, the mat is then heated to an effective temperature to set or cure the binder composition. This can be accomplished with can driers or any one or more drying devices used in the art. For example, the binder-saturated membrane is then transferred onto another porous metal screen for conveyance through a tunnel oven. The heat of the oven is maintained at a temperature within the range of from about 135° C. to about 300° C., preferably from about 135° C. to about 275° C., and more preferably from about 175° C. to 260° C. For example, at about 205° C., the mat is heated at this temperature for about 55 seconds. After the mat is conveyed cut of the oven, it is wound into a roll. The rolled mat may then be used for further processing.

The cured binder-containing fibrous mat has good strength and tensile properties such as wet and dry tensile strength and tear strength to be used as a base or supporting layers in roofing products and other products, where a good strength mat is required along with good rot resistance. A Class A fire rating is also attainable.

The fibrous mats of this invention also may be used as non-woven fabrics such as backings for reinforced plastics, wiping cloths, shoe innersoles, book bindings, battery separators, backings for vinyl fabric, furnace filters, rug backings, coated fabrics, automotive side-door paneling, backing for vinyl upholstery, heat-sealable battings, air filters, decorative ribbons and wrappings, electrical insulation, soundproofing, light-weight insulation and moisture barrier mat product, packaging, gaskets, cable wrappings, clothing, sheets, wall coverings, etc. In general, any end-use where a fire-resistant, light-stable textile structure is required or desired may take advantage of the binder composition of this invention.

EXAMPLE 1

Ammonia Modified Aldehyde Condensation Polymer

An ammonia-modified aldehyde condensation polymer was prepared as follows. Where pH adjustment is noted in the following, a sodium hydroxide solution (25% NaOH in water) and/or a sulfuric acid solution (7% $H_2SO_4$ in water) was used as necessary. The following ingredients were placed in a kettle reactor in about the following amounts:

2.5 parts water
58.6 parts formaldehyde solution (52% formaldehyde in water), the reactor was equipped with a temperature controller, an agitator, and heating and cooling coils. As shown in Example 2 infra., urea-formaldehyde concentrates are preferably utilized. Such concentrates are commercially available and preferred from an economic standpoint as less water needs to be added and removed. The pH was adjusted to about 4.7–4.9. Then about 8.8 parts of ammonium hydroxide solution (28% $NH_4OH$ in water) was charged in less than about 25 minutes. Heat was applied to obtain a temperature of about 75° C. and held at that temperature for about 5 minutes. The pH was adjusted to at least about 8.0. The reactor contents were then cooled to less than about 55° C. About 29 parts of urea prill were added thereto while continuing to cool and maintaining a temperature between about 20° C. and about 35° C. Urea pellets or shot may also be used. While mixing to dissolve the urea, the reactants were heated to about 40° C. The pH was adjusted to at least 8.8. The reactants were then heated to about 97° C. over about a 30 minute period, while maintaining a pH of at least about 6.6. The temperature was then held at this level for about 15 minutes maintaining a pH of at least about 6.0. The reactor contents were then rapidly cooled to about 85° C. and held there until a Gardner-Holdt viscosity of "A" was achieved (about 45 minutes). Upon achieving an "A" viscosity, the reactor contents were cooled to about 65° C. and held at that level until a viscosity of "D" was achieved (about 20 minutes). During these two time periods, the pH was maintained at a pH of at least about 4.7. Thereafter, the pH was adjusted to a pH ranging from about 7.7 to about 8.0, while adjusting and maintaining the temperature to about 60° C. A vacuum was applied to the reactor and about 11% of the in-kettle batch weight was distilled as rapidly as possible. The viscosity was about "KL". After cooling to about 25 ° C., about 1 part triethylamine sulfate (as a latent catalyst; also known as N,N-diethylethane amine sulfate) was added to the reactor contents. After about 10 minutes of mixing, the pH was adjusted to about 8.0. The final product had a refractive index at 25° C. of about 1.45.

EXAMPLE 2

Ammonia-Modified Aldehyde Condensation Polymer with Silica Colloid

An ammonia-modified aldehyde condensation polymer was prepared as follows. Where pH adjustment is noted in the following, a sodium hydroxide solution (25% NaOH in water) and/or a sulfuric acid solution (7% $H_2SO_4$ in water) was used as necessary. The following ingredients were placed in a kettle reactor in about the following amounts:
- 0.05 parts water
- 35.7 parts formaldehyde solution (52% formaldehyde in water),
- 28.5 parts urea-formaldehyde concentrate (about 23% urea, 53% formaldehyde, 24% water; F to U mole ratio is about 4.6:1), the reactor was equipped with a temperature controller, an agitator, and heating and cooling coils. Urea-formaldehyde concentrates with lower amounts of water are also commercially available and preferred from an economic standpoint as less water needs to be removed. The pH was adjusted to about 4.7–5.0. Then about 8.9 parts of ammonium hydroxide solution (28% $NH_4OH$ in water) was charged in less than about 25 minutes. Heat was applied to obtain a temperature of about 75° C. and held at that temperature for about 5 minutes. The pH was adjusted to at least about 8.0. The reactor contents were then cooled to less than about 55° C. About 23.8 parts of urea prill were added thereto while continuing to cool and maintaining a temperature between about 20° C. to about 35° C. Urea pellets or shot may also be used. While mixing to dissolve the urea, the reactants were heated to about 40° C. The pH was adjusted to at least 8.8. The reactants were then heated to about 97° C. over about a 30 minute period, while maintaining a pH of at least about 6.6. The temperature was then held at this level for about 15 minutes maintaining a pH of at least about 6.0. The reactor contents were then rapidly cooled to about 85° C. Upon reaching 85° C., about 0.13 parts of sulfuric acid solution was added below the surface while continuing to mix. The reactor contents were then held at about 85° C. until a Gardner-Holdt viscosity of "A" was achieved (about 60 minutes). Upon achieving an "A" viscosity, the reactor contents were cooled to about 70° C. and held at that level until a viscosity of "L" was achieved. During these two time periods, the pH was maintained at a pH of at least about 4.8 (about 30 minutes). Thereafter, the pH was adjusted to a pH ranging from about 7.8 to about 8.3, while adjusting and maintaining the temperature to about 60° C. Then about 0.73 parts of urea prill was added to the reactor contents in less than 20 minutes. The temperature was then held at about 60° C. for about 10 minutes and then rapidly cooled to about 25° C. After cooling to about 35° C. during this cooling procedure, about 1 part triethylamine sulfate (as a latent catalyst) was added to the reactor contents. Thereafter, about 1.1 parts of cationic silica colloid (NALCO® SJ-612, an aluminum oxide coated silica sol with a particle size of about 20 nanometer; available from Nalco Chemical Co., Naperville, Ill.) and mixed for about 5 minutes. After about 10 minutes of mixing, the pH was adjusted to about 8.1. The final product had a refractive index at 25° C. of about 1.448 with a viscosity of "G-K", about 55% non-volatiles by refractive index and a water dilutability greater than 10:1. If desired, the silica colloid may be added later when formulating the binder composition.

EXAMPLE 3

Fire Resistance Tests

In this example, various bonded mats were prepared and tested in accordance with the procedures outlined in the American Society for Testing and Materials (ASTM) Test method E84-87a. This test method is also described by ANSI 2.5, NFPA 255, UL723, UBC 42-1 and UL 1256. The purpose of this test is to determine the burning characteristics of the material under test by evaluating the flame spread over its surface and the density of the smoke developed when exposed to a test fire. This will then develop a basis on which the surface burning characteristics of different materials may be compared.

In this ten minute test, a material is exposed to a calibrated flame which will produce a flame spread along the entire length of a red oak flooring calibration specimen in 5.5 minutes. By past methods of calculating Flame Spread Index (FSI) this meant that red oak flooring had an FSI of 100. However, the FSI equations were modified in 1979 resulting in red oak having an FSI of about 91. The Smoke Developed index value for red oak remains unchanged at 100. The FSI and Smoke Developed test results of a material are compared with those of red oak previously discussed and those of asbestos-cement board where FSI and Smoke Developed values are zero.

The FSI and Smoke Developed results are frequently used by building code officials and regulatory agencies for determining the acceptance of building materials used in various applications. The most widely accepted classification system for use of these tunnel results is found in the National Fire Protection Association Life Safety Code, NFPA 101 which indicates the following:
- Class A: 0 to 25 FSI
- Class B: 26 to 75 FSI
- Class C: 76 to 200 FSI
- Class D: 201 to 500 FSI
- Class E: Over 500 FSI The accepted premise is that the higher the Flame Spread Index, the greater the fire hazard although the relationship between the numbers developed under this test and life safety in fire have not been adequately established.

Six bonded mat compositions denoted Samples I through VI, respectively, were prepared and tested. The unbonded mats were a mixture of mineral wool and glass fibers and were prepared using a wet-laid process. The unbonded mats were then saturated with the binder composition, dried and heat cured on a wet process glass mat machine. The bonded mats had approximately 75% by weight fiber and 25% by weight cured binder.

The resins used in preparing the various binder compositions were the resin prepared in Example 1 (Ex. 1), and the resin containing silica colloid prepared in Example 2 (Ex. 2).

The latexes used in preparing the various binder compositions were DOW DL249NAC (D249), an emulsified carboxylated vinylidene chloride/butadiene polymer available from DOW Chemicals, and AIRFLEX 4530 (A4530), an emulsified ethylene/vinyl chloride polymer available from Air Products and Chemicals, Inc., Allentown, Pa.

One set of test samples consisting of three 21 inch by 96 inch by ½ inch 5-ply plywood was prepared for each mat, except for Sample I which used a nominal 7/16 inch Oriented Strand Board (OSB) instead of ½ inch 5-ply plywood. The test samples were faced on one side with the respective bonded mat. Prior to testing, the Samples were conditioned at 50% RH and 70° F. The bonded mat compositions and corresponding test results are given in Table 1.

TABLE 1

| Sample | FIBER[a] (Wool/ Glass) | BINDER COMPOSITION[b] Latex/ Wt. % | Resin/ Wt. % | Silica Yes/No | Mat Basis Weight[c] | FIRE RESISTANCE TEST[f] FSI | SDI |
|---|---|---|---|---|---|---|---|
| I | 90/10 | D249/100 | — | No | 4(175) | 85 | 315 |
| II | 80/20 | D249/75 | Ex.1/25 | No | 4.6(200) | 30 | 145 |
| III | 80/20 | A4530/75 | Ex.1/25 | No | 4.6(200) | 40 | 185 |
| IV | 80/20 | D249/75 | Ex.1/25 | No | 4.6(200 | 40 | 140 |
| V | 80/20 | D249/80 | Ex.2/20 | Yes | 6(260)[d] | 30 | 70 |
| VI | 80/20 | D249/80 | Ex.2/20 | Yes | 4(175) | 40 | 25 |

[a]Weight ratio of mineral wool fibers to glass fibers (weight percent/weight percent)
[b]Latexes and resins are described above in this example; Wt. % is weight percent; "Silica (Yes/No)" indicates the presence or absence of silica colloid in the binder composition.
[c]Pounds per 100 square feet (grams per square meter)
[d]Two layers of mat, each mat weighing approximately 3 pounds per 100 square feet.
[f]Sample I used nominal 7/16 inch OSB and Samples II–VI used ½ inch 5-ply plywood.

During the testing of Sample II, at the burner end of the test tunnel, the mat buckled and wrinkled in the high heat areas. Two test result properties were collected during this run: Flame Spread Index (FSI) and Smoke Development Index (SDI), which were 40 and 185 respectively. The targeted FSI for a Class A rating is 25. A low SDI would allow improved vision in a smoke filled environment. Though the Sample II test results demonstrate a need for improvement, these results were a significant improvement over Sample I which had an FSI of 85 and an SDI of 315.

Samples III and IV were prepared using different embodiments of the binder composition of the present invention to compare the effects two different latexes in these binders. Both mat samples were bonded with a 25%/75% mixture of the rein of Ex. 1 and a latex emulsion, either A4530 or D249. The bonded fiber mat was overlaid on ½" plywood and subjected to the ASTM Test Method E 84-87a. The basis weights of the test specimen were approximately 200 grams per square meter (4.6 pounds per 100 square feet). In both test runs, the mat slightly sagged away from the plywood in the high heat area. Sample III with the A4530 provided a Flame Spread Index (FSI) of 40 and a Smoke Development Index (SDI) of 185. Sample IV with the D249 provided an FSI of 40 and an SDI of 140. The 40 FSI achieved a Class B, 26-75, National Fire Protection Association Life Safety Code, NFPA 101, with a Class A, 0-25, the targeted goal. A low SDI would allow improved vision in a smoke filled environment. It was concluded that the class A rating could be achieved with these binder composition embodiments if the basis weight of the mat were increased from the 200 grams per square meter to 260 grams per square meter.

Sample V provided a FSI of 30 and an SDI of 70. The FSI level of 30 was achieved with an embodiment of the improved binder Composition of the present invention, resin of Ex. 2 and D 249, an increase in the mat facet basis weight with two layers of mat instead of one in an attempt to evaluate the basis weight of approximately 260 grams per square meter. The two layer concept although sound allowed the burner flame to separate the mat layers and influence the final test results. It was concluded that the Class A rating could be achieved with a single mat web bonded with the same binder composition with a basis weight of 260 grams per square meter.

Sample VI provided a FSI of 40 and an SDI of 25. The FSI level of 40, comparable to that of Samples III and IV, was achieved with an embodiment of the improved binder composition of the present invention containing silica colloid at a lower mat facet basis weight (175 grams versus 200 grams per square meter).

Samples V and VI show a significant reduction in SDI over Samples II–IV which is in part due to the presence of the silica colloid.

Based on the fire tunnel testing conducted on the two layer mat, which was bonded with a 20% of the silica colloid-containing urea-formaldehyde resin of Ex. 2/80% D249 latex emulsion mix, a single layer mat with the basis weight of about 260 grams per square meter or about 6 pounds per square foot would be expected to pass the ASTM E 84-87a Class A Rating of 0-25.

While the invention has been described with reference to certain preferred embodiments, and exemplified with respect thereto, the skilled artisan will appreciate that various changes, substitutions, modifications and omissions may be made without departing from the spirit of the invention. Accordingly, it is intended that the scope of the present invention be limited solely by that of the following claims.

I claim:

1. A binder composition suitable for impregnating and coating fibrous mats and for bonding the fibers thereof when cured, wherein said binder composition is fire resistant when cured, said binder composition comprising:
   a stable mixture of
      a fire resistant latex,
      a thermosetting, aldehyde condensation polymer, and an effective amount of an aqueous silica colloid to enhance the fire retardant properties of the cured binder composition and yet remain compatible with the other components of the binder composition prior to curing,
   wherein the weight ratio of said latex to said aldehyde condensation polymer is at least 1:1 on a non-volatile weight basis.

2. The binder composition of claim 1, wherein said binder composition comprises
   a stable mixture of
      50 to about 95 percent by weight of said fire resistant latex based on the weight of polymer and latex,
      about 5 to 50 percent by weight of said aidehyde condensation polymer based on the weight of polymer and latex, and
      said effective amount of said aqueous silica colloid, wherein the weight percentages are based on non-volatile materials.

3. The binder composition of claim 1, wherein said fire resistant latex is a halogenated latex polymer.

4. The binder composition of claim 3, wherein said halogenated latex polymer is a carboxylated, halogenated latex polymer.

5. The binder of composition claim 1, wherein said aldehyde condensation polymer is a urea-aldehyde condensate.

6. The binder composition of claim 5, wherein said urea-aldehyde condensate is a modified urea-aldehyde condensate, wherein said modified urea-aldehyde condensate is prepared by reacting urea, an aldehyde and a modifying agent selected from the group consisting of aqueous ammonia, anhydrous ammonia, a primary polyamine and a combination thereof during the condensation reaction.

7. The binder composition of claim 6, wherein said modified urea-aldehyde condensate is a modified urea-formaldehyde condensate.

8. The binder composition of claim 6, wherein said modifying agent is aqueous ammonia.

9. The binder composition of claim 6, wherein said modifying agent is a primary polyamine.

10. The binder composition of claim 9, wherein said polyamine is an alkyl primary diamine.

11. The binder composition of claim 10, wherein said alkyl primary diamine is a $C_1$-$C_6$ alkyl primary diamine.

12. The binder composition of claim 1, wherein said silica colloid is a cationic silica colloid.

13. The binder composition of claim 1, wherein said effective amount of the silica colloid ranges from about 0.1 to about 10% by weight based on the weight of said aldehyde condensation polymer, on a non-volatile materials weight basis.

14. The binder composition of claim 13, wherein said effective amount of the silica colloid ranges from about 0.1 to about 5% by weight based on the weight of said aldehyde condensation polymer, on a non-volatile materials weight basis.

15. The binder composition of claim 1, wherein said binder comprises:
a stable mixture of
about 60 to about 80 percent by weight of said fire resistant latex, and
about 20 to about 40 percent by weight of said aldehyde condensation polymer, based on the weight of said latex and said aldehyde condensation polymer, and
about 0.1 to about 5 percent by weight of said silica colloid, based on the weight of said aldehyde condensation polymer, on a non-volatile materials weight basis.

16. A binder composition suitable for impregnating and coating fibrous mats and for bonding the fibers thereof when cured, wherein said binder composition is fire resistant when cured, said binder composition comprising:
a stable mixture of
50 to about 95 percent by weight of a fire resistant latex, and
about 5 to 50 percent by weight of a thermosetting, modified urea-aldehyde condensate, based on the weight of said latex and said condensate, and
0.1 to about 10 percent by weight of an aqueous silica colloid, based the weight of said condensate, on a non-volatile materials weight basis,
wherein the modified urea-aldehyde condensate is prepared by reacting urea, an aldehyde and a modifying agent selected from the group consisting of aqueous ammonia, anhydrous ammonia, a primary polyamine and a combination thereof during the condensation reaction.

17. The binder composition of claim 16, wherein said fire resistant latex is a halogenated latex polymer.

18. The binder composition of claim 17, wherein said halogenated latex polymer is a carboxylated, halogenated latex polymer.

19. The binder composition of claim 16, wherein said modified urea-aldehyde condensate is a modified urea-formaldehyde condensate.

20. The binder composition of claim 16, wherein said modifying agent is aqueous ammonia.

21. The binder composition of claim 16, wherein said modifying agent is a primary polyamine.

22. The binder composition of claim 21, wherein said polyamine is an alkyl primary diamine.

23. The binder composition of claim 22, wherein said alkyl primary diamine is a $C_1$-$C_6$ alkyl primary aliamine.

24. The binder composition of claim 16, wherein said binder composition comprises:
a stable mixture of
about 60 to about 80 percent by weight of said fire resistant latex, and
about 20 to about 40 percent by weight of said modified urea-aldehyde condensate, based on the weight of said latex and said condensate, and
about 0.1 to about 5 percent by weight of said silica colloid, based on the weight of said condensate, on a non-volatile materials weight basis.

25. A fire resistant composition suitable for bonding the fibers of fibrous mats, said composition comprising:
a cured mixture of
a fire resistant latex,
a thermosetting, aldehyde condensation polymer, and
an effective amount of an aqueous silica colloid to enhance the fire retardant properties of said composition after curing and yet remain compatible with the other components of said composition prior to curing,
wherein the weight ratio of said latex to said aldehyde condensation polymer is at least 1:1 on a non-volatile weight basis.

26. A binder composition suitable for impregnating and coating fibrous mats and for bonding the fibers thereof when cured, said binder composition consisting essentially of:
a stable mixture of a fire resistant latex and an aldehyde condensation polymer,
wherein said stable mixture contains
about 50 to about 95 percent by weight of said fire resistant latex based on the weight of said polymer and latex, and
about 5 to 50 percent by weight of said aldehyde condensation polymer based on the weight of polymer and latex,
wherein said weight percentages are based on non-volatile materials, and
wherein said aldehyde condensation polymer is a urea-aldehyde condensate modified with ammonia or a polyamine.

* * * * *

UNITED STATES PATENT AND TRADEMARK OFFICE
CERTIFICATE OF CORRECTION

PATENT NO. : 5,389,716
DATED : February 14, 1995
INVENTOR(S) : Larry R. Graves

Page 1 of 2

It is certified that error appears in the above-indentified patent and that said Letters Patent is hereby corrected as shown below: On title page, item [56]

IN OTHER PUBLICATIONS

On page 2, column 1, line 15, the article should correctly read "Urea-Formaldehyde Concentrate UFC".

On page 2, column 1, line 17, the article should correctly read "Typical Economies Effected by Using U.F. Concentrate-85 in Place of Aqueous Formaldehyde".

On page 2, column 2, line 3, the correct spelling of the author's name is "E.T. Hsu".

In column 1, line 24, please insert a comma after the word "Similarly".

Column 5, line 9, --insert a comma after "C." (2nd occurrence)

In column 6, line 47, please delete the word "aidehyde" and insert therefor the word --aldehyde--.

In column 13, line 51, please delete the word "cut" and insert therefor the word --out--.

In column 15, line 51, please delete "SJ-612" and insert therefor --1SJ-612--.

In column 17, lines 53 and 67, please delete each occurrence of the word "facet" and replace therefor the word --facer--.

IN THE CLAIMS

Col. 18, claim 2, line 58, please delete the word "aidehyde" and insert therefor the word --aldehyde--.
Col. 20, line 20,
In claim 23, please delete the last word of the claim, "aliamine" and insert therefor the word --diamine--.

UNITED STATES PATENT AND TRADEMARK OFFICE
CERTIFICATE OF CORRECTION

PATENT NO. : 5,389,716
DATED : February 14, 1995
INVENTOR(S) : Larry R. Graves

It is certified that error appears in the above-indentified patent and that said Letters Patent is hereby corrected as shown below:

Col. 20,
IN THE CLAIMS

In claim 26, line 46, please delete the word "aidehyde" and insert therefor the word --aldehyde--.

Signed and Sealed this

Twenty-seventh Day of June, 1995

Attest:

BRUCE LEHMAN

Attesting Officer    Commissioner of Patents and Trademarks